United States Patent
Johs et al.

[19]

[11] Patent Number: 5,969,818
[45] Date of Patent: *Oct. 19, 1999

[54] BEAM FOLDING OPTICS SYSTEM AND METHOD OF USE WITH APPLICATION IN ELLIPSOMETRY AND POLARIMETRY

[75] Inventors: Blaine D. Johs; Ping He, both of Lincoln, Nebr.

[73] Assignee: J. A. Woollam Co. Inc., Lincoln, Nebr.

[*] Notice: This patent is subject to a terminal disclaimer.

[21] Appl. No.: 09/144,764

[22] Filed: Aug. 31, 1998

Related U.S. Application Data

[63] Continuation-in-part of application No. 09/033,694, Mar. 3, 1998
[60] Provisional application No. 60/094,104, Jul. 24, 1998.
[51] Int. Cl.⁶ .................................................. G01J 4/00
[52] U.S. Cl. .................................... 356/369; 356/364
[58] Field of Search ................................ 356/364, 365, 356/366, 367, 368, 369; 250/225

[56] References Cited

U.S. PATENT DOCUMENTS

| | | | |
|---|---|---|---|
| H230 | 3/1987 | Smith | 356/369 |
| 3,874,797 | 4/1975 | Kasai | 356/118 |
| 4,381,151 | 4/1983 | Smith | 356/369 |
| 4,681,450 | 7/1987 | Azzam | 356/367 |
| 4,801,798 | 1/1989 | Lange | 250/225 |
| 5,209,813 | 5/1993 | Oshida et al. | 356/138 |
| 5,229,833 | 7/1993 | Stewart | 356/352 |
| 5,337,146 | 8/1994 | Azzam | 356/367 |
| 5,373,359 | 12/1994 | Woollam et al. | 356/328 |
| 5,416,588 | 5/1995 | Ducharme et al. | 356/364 |
| 5,504,582 | 4/1996 | Johs et al. | 356/369 |
| 5,521,706 | 5/1996 | Green et al. | 356/369 |

OTHER PUBLICATIONS

Division–of–amplitude photopolarimeter based on control diffraction from metallic grating, Azzam App Optics, vol. 31, No. 19 Jul. 1992.

Primary Examiner—Hoa Q. Pham
Attorney, Agent, or Firm—James D. Welch

[57] ABSTRACT

Disclosed is an electromagnetic beam directing system and method which enables changing the direction of propagation of a beam of electromagnetic radiation without significantly changing the phase angle between orthogonal components therein. Two pairs of mirrors are oriented to form two orthogonally related planes such that phase shift entered to an electromagnetic beam by interaction with the first pair of mirrors is canceled by interaction with the second pair.

16 Claims, 4 Drawing Sheets

FIG. 3
FIRST PAIR OF MIRRORS

FIG. 4
SECOND PAIR OF MIRRORS

FIG. 5
3D VIEW OF ALL 4 MIRROR REFLECTIONS

BEAM FOLDING OPTICS SYSTEM AND METHOD OF USE WITH APPLICATION IN ELLIPSOMETRY AND POLARIMETRY

This Application is a Continuation-In-Part of co-pending U.S. application Ser. No. 09/033,694 filed Mar. 3, 1998 still pending, and of Provisional application Ser. No. 60/094,104 filed Jul. 24, 1998.

TECHNICAL FIELD

The present invention relates to electromagnetic beam directing systems and methods which find application in ellipsometry and polarimetry and the like. More particularly, the present invention is an electromagnetic beam directing system and method which enables changing the direction of propagation of a beam of electromagnetic radiation without significantly changing the phase angle between orthogonal components therein.

BACKGROUND

It is well known that ellipsometer, polarimeter and the like systems allow determination of sample system physical and optical properties, (such as thickness, refractive index and extinction coefficient of surface films thereon), by detecting change in "Polarization State" and/or Intensity of a beam of polarized light which is caused to interact with said sample system, where Polarization State here refers to a set of values for Polarized Light Beam Orthogonal Components, (such as "S" and "P"), Magnitude Ratio, and a Phase Angle therebetween. (It is noted that "P" refers to that component which is in a plane containing the normal to a sample system and incident and/or transmitted beam(s) of polarized light, and "S" refers to that component perpendicular thereto and parallel to the surface of said sample system. It is also noted that a "full" polarization state also requires designation of an absolute value to which a magnitude ratio is referenced, and the direction of rotation of a polarized beam of light).

As general background, it should be appreciated that ellipsometer systems can be broadly classified as:

1. Rotatable Element or Intensity Modulating Rotating Element Ellipsometers (REE); and
2. Phase Modulating Modulation Element Ellipsometers (MEE).

An example, for instance, is presented in a Patent to Woollam et al., U.S. Pat. No. 5,373,359, which describes a Rotating Analyzer Ellipsometer (RAE) in which a Light Source provided beam of light is caused to pass through a Polarizer, (which serves to set a Porarization State therein), then interact with a sample system. Said interaction with said sample system serves to alter the Polarization State of said polarized beam of light, which polarized beam of light then sequentially encounters a Rotating Analyzer and a Dispersion Optics, (eg. a Diffraction Grating is specified), which forms therefrom a multiplicity of essentially single wavelength polarized beams of light. Said multiplicity of essentially single wavelength polarized beams of light are then caused to enter a Photo Detector Array, in which Photo Detector Array, individual Detector Elements serve to develop a representative signal for each. Fourier Analysis, for instance, of said signals allows determination of parameters which allow determination of sample system characterizing PSI and DELTA values. It is noted that in said Woollam et al. (RAE) there is no additional focusing applied after the polarized beam of light encounters the sample system. Additional Patents to Johs et al. and Green et al., U.S. Pat. Nos. 5,504,582 and 5,521,706 respectively provide further insight into rotating analyzer ellipsometer systems.

Another Patent, U.S. Pat. No. 5,416,588 to Ducharme et al., describes a Modulation Element Ellipsometer (MEE) comprised of a Light Source, a Polarizer, a Polarization State Modulator Element, a means for splitting Orthogonal Components in a Beam of Polarized Light after interaction with a sample system, two Detector Elements and an Analysis system. In use a beam of light is provided by the Light Source and a state of Polarization is set therein by said Polarizer, after which the polarized beam of light is subjected to a Polarization State Modulation and caused to interact with a sample system, which sample system changes the State of Polarization of said Phase Modulated Polarized beam of light. Orthogonal Components of said Polarized beam of Light are then isolated and subjected to separate, for instance, Fourier Analysis. Appropriate utilization of the Coefficients of the terms of a Fourier Series allows determination of sample system characterizing PSI and DELTA values. It is noted the described Modulation Element Ellipsometer (MEE) utilizes Coefficients from Fourier Series based upon both Orthogonal Components. Some Modulation Ellipsometers utilize Fourier Series Coefficients from only one such Orthogonal Component. While the specifics of signal generation are different in (REE) and (MEE) ellipsometers, and even amongst Ellipsometers of similar type, the end result of utilization thereof is provision of PSI and DELTA values for sample systems analyzed therein.

Generally, the present invention can be applied to essentially any ellipsometer or polarimeter and the like system, and provides a solution to a problem in the use thereof which presents when a sample system is to be investigated with a polarized beam of electromagnetic radiation which is initially oriented in a propagation direction other than appropriate to cause it to impinge upon a sample system, and in which space constraints prevent reorienting the source of the initially oriented polarized beam of electromagnetic radiation.

One application of the present invention is identified in co-pending U.S. patent application Ser. No. 09/033,694. Said 694 Application describes a system wherein a beam of electromagnetic radiation is to be made to impinge upon a sample system at an angle-of-incidence which is beyond, (eg. 65 degrees), a typical Brewster Angle, which Brewster angle is near seventy-five (75) degrees in most semiconductors. A typical range of angle-of-incidence over which the present invention can be applied is between thirty (30) and eighty (80) degrees from a normal to a sample system surface, with a range of deviation from a Brewster angle of between five (5) and ten (10) degrees being of particular relevance. It is noted that the present invention provides convenient means by which to achieve a smaller electromagnetic beam "Spot" size, (which accompanies a smaller angle-of-incidence on an investigated material system). The present invention also enables realization of laterally-compact ellipsometer or polarimeter and the like systems.

With an eye to the present invention, a Search of Patents was conducted, with the result being that very little was found. A Patent to Kasai, U.S Pat. No. 3,874,797 is disclosed, however, as it describes a system for directing an electromagnetic beam utilizing totally reflecting prisms. As well, a Patent to Lange, U.S. Pat. No. 4,801,798 is disclosed as it describes a system which utilizes electromagnetic beam directing reflective means in a system which causes an electromagnetic beam to impinge upon an investigated sample system at an angle very near to a perpendicular to a surface thereof. A Patent to Smith, U.S. Pat. No. 4,381,151 is also disclosed as it describes a system in which numerous reflections of a light beam occur.

A paper titled "Division-Of-Amplitude Photopolarimeter Based on Conical Diffraction For a Metallic Grating" by Azzam, in Applied Optics, Vol. 31, No. 19, Jul. 1, 1992 and U.S. Pat. No. 5,337,146 are also noted. While the system described in said references is somewhat relevant, the purpose of the System and Method of Use described in said references is to allow simultaneous measurement of all four Stokes Parameters of a Beam of Light.

It is also noted that the reference titled "ELLIPSOMETRY AND POLARIZED LIGHT", by Azzam and Bashara, North-Holland, 1977 is incorporated by reference into this Disclosure for the purpose of providing general information regarding sample analysis systems utilizing electromagnetic beams, and fundamentals of electromagnetic beams.

In view of known prior art, it is apparent that a system, and method of its use, which would allow a user of a sample analysis system such as a ellipsometer, polarimeter or a functionally similar system, to investigate sample systems with beams of electromagnetic radiation which are initially not oriented in a propagation direction appropriate to effect interaction with a sample system, or at non-optimal angles-of-incidence with respect to a normal to a material system surface, without requiring major system reconfiguration procedures be performed, which system and method allow changing the propagation direction of the initial beam of electromagnetic radiation without changing the phase angle between orthogonal components thereof, would be of great utility. The present invention provides such a system and method of its use.

DISCLOSURE OF THE INVENTION

The present invention is, in one sense, a system for changing the initial propagation direction of a beam of electromagnetic radiation without significantly changing the polarization state (ie. phase angle between orthogonal components thereof). Said system comprises two pairs of reflecting means oriented so that said initial beam of electromagnetic radiation reflects from a first reflecting means in the first pair of reflecting means to a second reflecting means in said first pair of reflecting means, in a first plane, and such that the beam of electromagnetic radiation which reflects from said second reflecting means in said first pair of reflecting means is directed to a first reflecting means in the second pair of said reflecting means, and reflects from said first reflecting means in said second pair of reflecting means to a second reflecting means in said second pair of reflecting means, in a second plane. Said first and second planes are oriented other than parallel to one another, and in the preferred embodiment are strictly orthogonal to one another.

The end result is that direction of propagation of the beam of electromagnetic radiation reflected from the second of the reflecting means in the second pair of reflecting means is different from the propagation direction of the initial beam of electromagnetic radiation. The basis of operation being that changes entered to the phase angle between orthogonal components thereof, by the first of said pairs of reflecting means are effectively compensated by said second pair of reflecting means. That this will occur can be easily understood where said first and second planes are strictly orthogonal to one another, as in such a case, effects entered to one of the orthogonal components of a beam of electromagnetic radiation in the first pair of reflecting means, will be entered to the second of the orthogonal components of said beam of electromagnetic radiation in the second pair of reflecting means, and vice-verse. That is, any effects entered by the first pair of reflecting means will be canceled by the second. It is noted, however, that the present invention works to acceptable accuracy where the first and second planes are not oriented strictly orthogonal, and deviation from strict orthogonality of at least tenths (1/10's) of a degree are typically quite acceptable.

The first and second reflecting means of each of said first and second pairs thereof, preferably have essentially identical optical properties.

The present invention can also comprise first and second systems which each comprise two pairs of reflecting means, between which first and second systems is positioned a sample system. A system for changing the initial propagation direction of a beam of electromagnetic radiation without significantly changing the phase angle between orthogonal components thereof, then comprises:

a. a first system comprising two pairs of reflecting means as described infra herein;

b. a sample system; and c. a second system comprising two pairs of reflecting means as described infra herein;

such that in use the electromagnetic beam of radiation which reflects from the second reflective means of the first pair of reflective means interacts with a sample system prior to proceeding to the first reflective means of the second pair of reflective means. The basis of operation of said present invention which comprises first and second systems which each comprise two pairs of reflecting means, being that total changes entered to the phase angle between orthogonal components of a beam of electromagnetic radiation by said first and second systems comprising two pairs of reflecting means of reflecting means, sum to essentially zero. It is noted that in such a system, the plane of reflection between the first and second reflecting means of each of said first and second systems which each comprise two pairs of reflecting means, need not be essentially orthogonal to the plane of the reflection between the second pair of reflecting means in each of said first and second systems which each comprise two pairs of reflecting means. All that is important is that the total changes entered to the phase angle between orthogonal components of a beam of electromagnetic radiation by said first and second systems which each comprise two pairs of reflecting means, sum to essentially zero.

The present invention can also comprise a system with two pairs of reflecting means, between which first pair of reflecting means and second pair of reflecting means is positioned a sample system. That is, instead of providing two pairs of reflecting means on each side of a sample system, only a single pair of reflecting means is placed on each side of a sample system. In this case, preferably the reflecting means all have similar characteristics, and the plane of reflection between the first and second reflecting means of the first pair of reflecting means is essentially orthogonal to the plane of the reflection between the first and second reflecting means in the second pair of reflecting means.

Continuing, in another sense, the present invention is a method of providing a beam of electromagnetic radiation with a direction of propagation changed from the direction of propagation of an initial beam of electromagnetic radiation, without significantly changing the phase angle between orthogonal components in said beam of electromagnetic radiation, comprising the steps of:

a. providing a system for changing the initial propagation direction of a beam of electromagnetic radiation without significantly changing the phase angle between orthogonal components thereof, such as just described;

b. causing an initial beam of electromagnetic radiation to impinge upon the first reflecting means in the first pair of reflecting means and reflect therefrom;

c. accessing a resulting beam of electromagnetic radiation with a changed direction of propagation which reflects from the second reflecting means in the second pair of reflecting means.

Another present invention method of investigating a material system, comprises the steps of:

a. providing a material system investigating system comprising elements selected from the group consisting of:
   a. a light source;
   b. a polarizer;
   c. a first optic element;
   d. a first focusing optic;
   e. a material system stage;
   f. a second focusing optic;
   g. a second optic element;
   h. an analyzer;
   i. a detector; and
   j. at least one compensator;
   said light source and a polarizer, serving in use to produce a first generally horizontally oriented propagation direction polarized beam of electromagnetic radiation which is caused to interact with a first optic element and become a first generally vertically oriented propagation direction polarized beam of electromagnetic radiation. Said first generally vertically oriented propagation direction polarized beam of electromagnetic radiation is caused to pass through a first focusing optic and interact with a material system placed upon said material system stage. Said interaction with said material system causes a second generally vertically oriented propagation direction polarized beam of electromagnetic radiation to pass through a second focusing optic and interact with a second optic element, in which second optic element said second generally vertically oriented propagation direction polarized beam of electromagnetic radiation is caused to become a second generally horizontally oriented propagation direction polarized beam of electromagnetic radiation. Said second generally horizontally oriented propagation direction polarized beam of electromagnetic radiation passes through said analyzer and, via an aperture the shape of which is selected from the group consisting of: (circular and other than circular), enters a detector system for analysis. The first and second generally vertically oriented propagation direction polarized beams of electromagnetic radiation approach and are reflected from, respectively, said material system at essentially equal angles of Incidence and reflection (Θ), as viewed in frontal elevation;

b. causing said light source and a polarizer to produce a first generally horizontally oriented propagation direction polarized beam of electromagnetic radiation;

c. causing said first generally horizontally oriented propagation direction polarized beam of electromagnetic radiation to interact with said first optic element and become a first generally vertically oriented propagation direction polarized beam of electromagnetic radiation which is caused to pass through a first focusing optic and interact with a material system placed upon said material system stage;

d. causing a second generally vertically oriented propagation direction polarized beam of electromagnetic radiation provided by said first generally vertically oriented propagation direction polarized beam of electromagnetic radiation interaction with said material system to pass through a second focusing optic and interact with a second optic element, in which second optic element said second generally vertically oriented propagation direction polarized beam of electromagnetic radiation is caused to become a second generally horizontally oriented propagation direction polarized beam of electromagnetic radiation;

e. causing said second generally horizontally oriented propagation direction polarized beam of electromagnetic radiation to pass through said analyzer and said aperture and enter detector system;

wherein analysis of said second generally horizontally oriented propagation direction polarized beam of electromagnetic radiation is performed.

It should be noted that everywhere that the terminology "generally horizontally" is recited in the forgoing method, terminology such as "generally vertically", (or any functionally correct terminology), can be substituted, with functionally correct alteration of the terminology "generally vertically" being also entered so as to read appropriately.

Also, in the context of the present invention said first and second optic elements are to be considered "Beam Folding Optics" which in use, as described infra herein, serve to change an initial propagation direction of a beam of electromagnetic radiation entered thereto, without significantly changing the phase angle between orthogonal components thereof. It should be appreciated then, that the entire material system investigating system can be rotated, or the "Beam Folding Optics" thereof can be rotated, with the important constant being that a beam of electromagnetic radiation entering to a first or second optic element along one propagation direction, exits along another in an essentially unchanged state of polarization.

Figures 1, 2A:
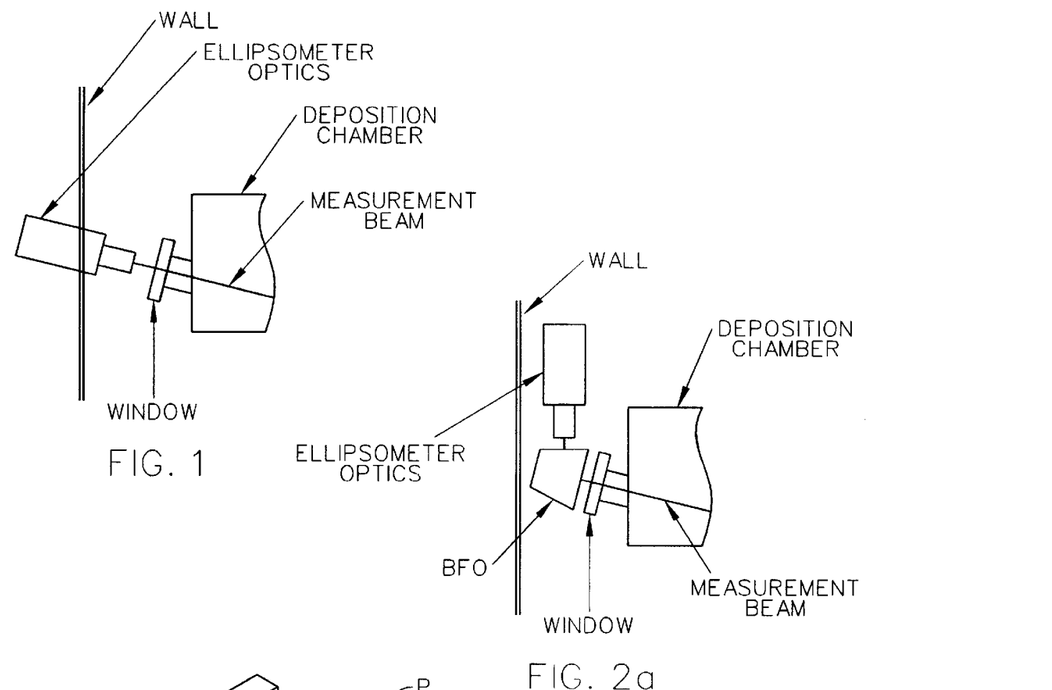
FIG. 1 shows a partial view of a typical ellipsometer system configuration wherein an "ellipsometer optics" provides a beam of electromagnetic radiation, (Measurement Beam), which, in use, is caused to impinge upon a sample system (not shown) which is present in the Deposition Chamber.
FIG. 2a shows a beneficial application of the present invention Beam Folding Optics (BFO) system in a setting such as shown in FIG. 1.
Figure 2B:
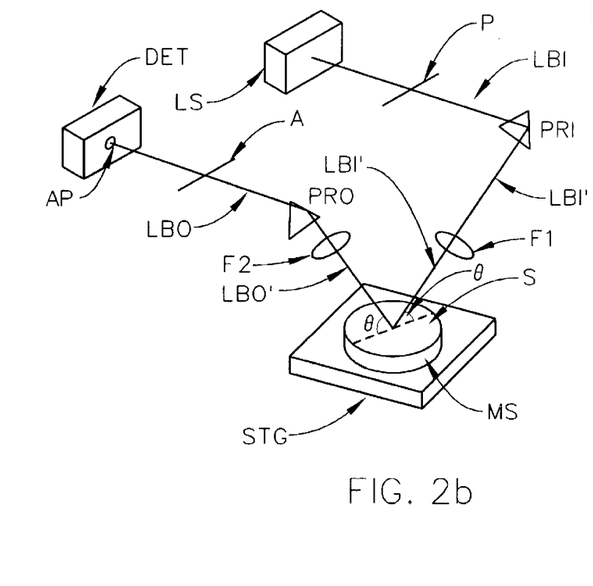
FIG. 2b shows a beneficial application of the present invention Beam Folding Optics (BFO) system in a setting such as shown in FIG. 1.

Otherwise stated, it is to be understood that, while a material system investigating system or a beam folding optics (BFO) in a material system investigating system is/are typically oriented in use so as to receive a beam of electromagnetic radiation, the propagation direction of which is oriented essentially horizontally, and divert it to a propagation direction which is oriented other than in an essentially horizontally oriented direction, (or vice-versa), as referenced to an internal frame of reference thereof, (which is typically aligned with an external frame of reference as by being set on a flat surface); in use a material system investigating system or beam folding optics (BFO), (identified as (PRI) or (PRO) in FIG. 2b), in a material system investigating system, can be rotated about at least one axis, so as to place the internal frame of reference "generally horizontally oriented direction and/or the other than generally horizontally oriented direction", (eg. generally vertically oriented), out of alignment with an external frame of reference "generally horizontally oriented and/or generally other than horizontally oriented direction". It is obvious that the present invention will still operate when so rotated, and that the terminology "generally horizontally oriented and/or generally other than horizontally oriented direction" is utilized only to as an easy to understand example. Further, as alluded to herein above, it is specifically clarified that the terminology "a generally horizontally oriented" and "other than a generally horizontally oriented" is used to identify the propagation direction of a beam of polarized electromagentic radiation, and not a polarization orientation of a linearly polarized beam of electromagentic radiation. This will be appreciated by reference to the accompanying Figures and discussion thereof in the Detailed Description Section of this Specification, which demonstrate electromagnetic beam propagation direction and change therein, consistant with the purpose of the present invention. In particular, the indication of the presence of a Polarizer (P) in FIGS. 1a and 2 is not to be taken to mean that the direction of polarization of a beam of polarized electromagnetic radiation exiting therefrom is necessarily horizontally oriented.

The present invention will be better understood by reference to the Detailed Description Section of this Disclosure, with reference being had to the accompanying Drawings.

DETAILED DESCRIPTION

Turning now to FIG. 1, there is shown a partial view of a typical ellipsometer system configuration wherein an "ellipsometer optics" provides a beam of electromagnetic radiation, (Measurement Beam), which, in use, is caused to impinge upon a sample system (not shown) which is present in the Deposition Chamber. In particular, note the propagation direction of the beam of electromagnetic radiation, (Measurement Beam).

Also shown in FIG. 1 is a Wall which is positioned such that an opening is required therein in order for the "ellipsometer optics" to be positioned as shown. FIG. 1 thereby demonstrates a problem which the present invention overcomes, said problem being that, in tight space locations, walls must be altered for standard ellipsometer system "ellipsometer optics" to be applied therein. In many cases in which space is tight, alteration of walls is not practical or even possible. Turning now to FIG. 2a there is shown an application of the present invention Beam Folding Optics (BFO) system. It is noted that the "ellipsometer optics" source of a beam of electromagnetic radiation, (measurement beam) does not project through the wall. Rather the "ellipsometer optics" is oriented vertically to the right of the shown Wall. However, it will be appreciated that the propagation direction of the beam of electromagnetic radiation, (measurement beam), which enters the Deposition Chamber through the Window in the Deposition Chamber is not changed from that shown in FIG. 1, in which the present invention beam folding optics (BFO) is not present. FIG. 2b shows a laterally compact ellipsometer or polarimeter system in which a source of a beam of electromagnetic radiation (LS) provides a beam of electromagnetic radiation (LBI) which is caused to pass through a polarizer (P), interact with a first present invention system for changing the initial propagation direction of a beam of electromagnetic radiation without significantly changing the phase angle between orthogonal components thereof identified as (PRI), then proceed as electromagnetic radiation beam ("LBI') and pass through a focusing optic (F1) before reflecting from the surface (S) of a sample system (MS), which rests upon a stage (STG). After reflection from the sample system (MS) the beam of electromagnetic radiation (LBO') proceeds through focusing optic (F2) and then interacts with a second present invention system for changing the initial propagation direction of a beam of electromagnetic radiation without significantly changing the phase angle between orthogonal components thereof, identified as (PRO), then proceeds as electromagnetic radiation beam (LBO) through analyzer (A) and into detector (DET) via an aperture (A) therein. Such a system is subject in co-pending U.S. patent application Ser. No. 09/033,694, but in said co-pending Application the elements (PRI) and (PRO) are described as being totally internally reflecting prisms which do not necessarily introduce phase retardation between orthogonal components of an electromagnetic beam caused to pass therethrough. The FIG. 2b system configuration is particularly useful in applications which require that an angle-of-incidence which a beam of electromagnetic radiation makes with respect to a normal to a sample system surface be small, (ie. approaching normal incidence). FIG. 2b serves as an example of a full ellipsometer or polarimeter system, (ie. a material system investigating system), rather than just the electromagnetic beam source half, as do FIGS. 1 and 2a.

With respect to the FIG. 2b, it is to be appreciated that a material system investigating system such as an ellipsometer or polarimeter system which incorporates the present invention can comprise elements selected from the group consisting of:

a. a light source (LS);

b. a polarizer (P);

c. a first optic element (PRI);

d. a first focusing optic (F1);

e. a material system stage (MS);

f. a second focusing optic (F2);

g. a second optic element (PRO);

h. an analyzer (A);

i. a detector (DET); and j. at least one compensator (C) (C');

said light source (LS) and a polarizer (P), serving in use to produce a generally horizontally oriented propagation direction polarized beam of electromagnetic radiation (LBI), said generally horizontally oriented polarized beam of electromagnetic radiation (LBI) being caused to interact with a first optic element (PRI) and become other than a generally horizontally oriented propagation direction polarized beam of electromagnetic radiation (LBI') which is caused to pass through a first focusing optic (F1) and interact with a material system (MS) placed upon said material system stage (STG), said interaction with said material system (MS) causing an other than generally horizontally oriented propagation direction polarized beam of electromagnetic radiation (LBO') to pass through a second focusing optic (F2) and interact with a second optic element (PRO), in which second optic element (PRO) said generally other than horizontally oriented propagation direction polarized beam of electromagnetic radiation (LBO') is caused to become a generally horizontally oriented propagation direction polarized beam of electromagnetic radiation (LBO), which generally horizontally oriented propagation direction polarized beam of electromagnetic radiation then (LBO) then passes through an analyzer (A) and, via an aperture (AP), the shape of which is selected from the group consisting of: (circular and other than circular), enters a detector system (DET) for analysis, which generally other than horizontally oriented propagation direction propagation direction polarized beams of electromagnetic radiation (LBI') and (LBO') approach and are reflected from, respectively, said material system (MS) at essentially equal angles of incidence and reflection (Θ), as viewed in frontal elevation.

Said material system investigating system can provide that the generally other than horizontal orientation propagation direction is a generally vertical orientation propagation direction.

Said material system investigating system can be oriented such that said first focusing optics (F1) serves to produce a very concentrated high intensity small area polarized beam of electromagnetic radiation (LBI') from collimated polarized beam of electromagnetic radiation (LBI) and said second focusing optic (F2) serves to "re-collimate" the polarized beam of electromagnetic radiation (LBO') which results from the focused generally other than horizontally oriented propagation direction polarized beam of electromagnetic radiation (LBI') being reflected from said material system (MS).

Said material system investigating system provides that smaller angles of incidence and reflection of said generally other than horizontally oriented propagation direction polarized beams of electromagnetic radiation (LBI') and (LBO') with respect to said material system (MS) result in higher intensity and smaller "spot" size of said polarized beam of electromagnetic radiation caused on said material system (MS).

Said material system investigating system allows that higher beam intensity and reduced Sample system Investigating spot size are realized without difficult light source (LS) and detector (DET) alignment being required, but rather by relatively easy adjustment of first and second optical element (PRI) and (PRO) orientations.

Said material system investigating system can provide that said first (PRI) and second optic (PRO) elements are both beam folding optics (BFO) systems for changing the initial propagation direction of a beam of electromagnetic radiation without significantly changing the phase angle between orthogonal components thereof.

Said material system investigating system can be, in use, rotated about at least one axis, so as to place the generally horizontally oriented direction and/or the other than generally horizontally oriented direction out of alignment with external frame of reference generally horizontally oriented and/or generally other than horizontally oriented direction (s). In particular, the generally horizontally oriented propagation direction beam (LBI) can be rotated to be oriented vertically, with the result being a system such as shown in FIG. 2a.

A system oriented as indicated by FIG. 2a can be described as comprising a light source and a polarizer, (eg. ellipsometer optics), which serve, in use, to produce a generally vertically oriented propagation direction polarized beam of electromagnetic radiation, said generally vertically oriented propagation direction polarized beam of electromagnetic radiation being caused to interact with a first optic element, and become other than a generally vertically oriented propagation direction polarized beam of electromagnetic radiation which is caused to interact with a material system placed upon a material system stage, said interaction with said material system causing a reflected other than generally vertically oriented propagation direction polarized beam of electromagnetic radiation to interact with a second optic element, in which second optic element said reflected other than generally vertically oriented propagation direction polarized beam of electromagnetic radiation is caused to become a generally vertically oriented propagation direction polarized beam of electromagnetic radiation, which generally vertically oriented propagation direction polarized beam of electromagnetic radiation then passes through an analyzer and enter a detector system for analysis, which generally other than vertically oriented propagation direction polarized beams of electromagnetic radiation approach and are reflected from, respectively, said material system at essentially equal angles of incidence and reflection (Θ), as viewed in frontal elevation.

Figure 3:
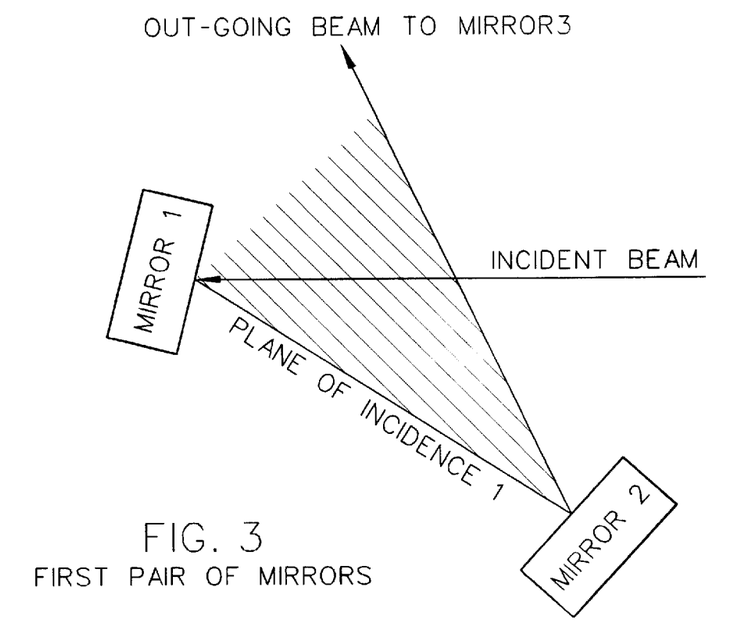
FIGS. 3, 4 and 5 demonstrate a present invention beam folding optics (BFO) system for changing the initial propagation direction of a beam of electromagnetic radiation without significantly changing the phase angle between orthogonal components thereof.
Figure 4:
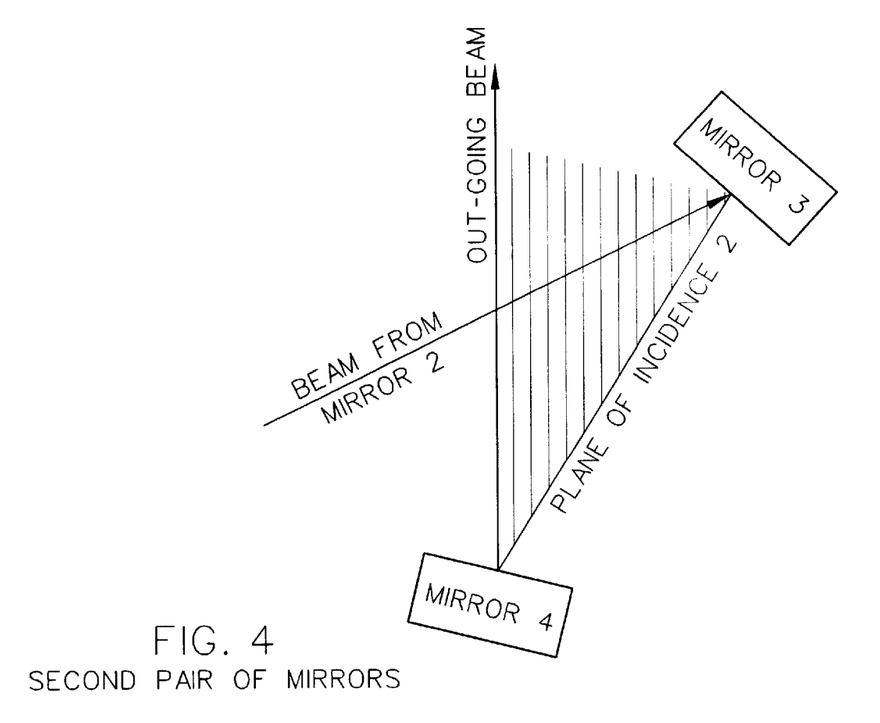
Figure 5:
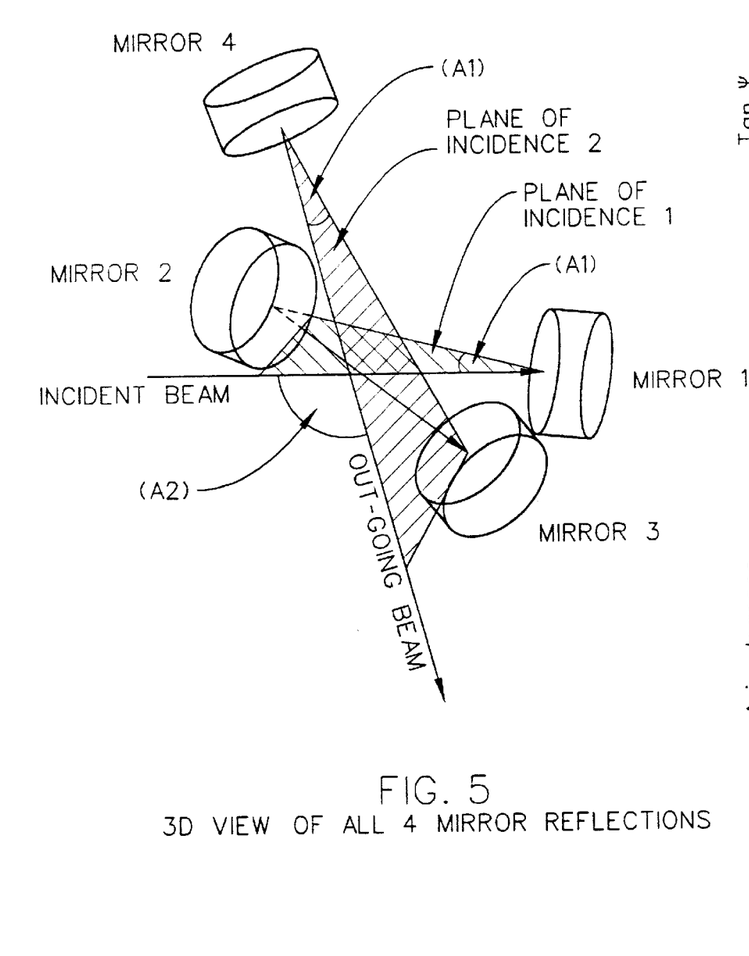

Turning now to FIGS. 3, 4 and 5, it will be appreciated that there is demonstrated a present invention beam folding optics (BFO) system for changing the initial propagation direction of a beam of electromagnetic radiation without significantly changing the phase angle between orthogonal components thereof. FIG. 5 shows that said beam folding optics comprises two pairs of reflecting means oriented so that said initial beam of electromagnetic radiation reflects from a first reflecting means, (Mirror 1), in the first pair of reflecting means to a second reflecting means, (Mirror 2), in said first pair of reflecting means, in a first plane. FIG. 3 shows said first pair of reflecting means separately. The beam of electromagnetic radiation which reflects from said second reflecting means (Mirror 2), in said first pair of reflecting means is directed to a first reflecting means, (Mirror 3), in the second pair of said reflecting means, and reflects from said first reflecting means, (Mirror 3), in said second pair of reflecting means to a second reflecting means, (Mirror 4), in said second pair of reflecting means, in a second plane. FIG. 4 shows said second pair of reflecting means separately. The result of application of the present invention beam folding optics (BFO) is that the direction of propagation of the beam of electromagnetic radiation reflected from the second of the reflecting means in the second pair of reflecting means is different from the propagation direction of the initial beam of electromagnetic radiation. And because said first and second planes are oriented other than parallel to one another, the changes entered to the phase angle between orthogonal components thereof, by the first of said pairs of reflecting means are effectively compensated by said second pair of reflecting means.

Figure 6:
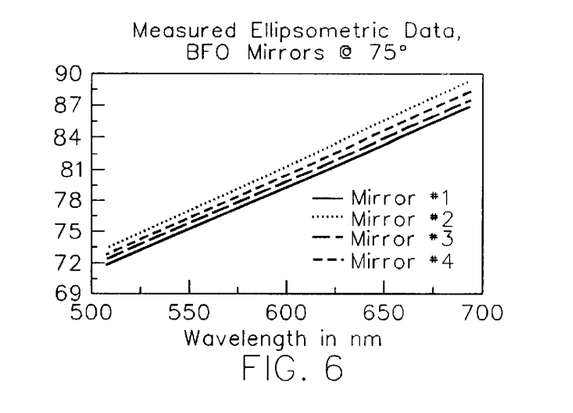
FIG. 6 shows the DELTA's of four reflecting means.

Next, a preferred embodiment of the present invention provides that the combined reflecting means in the first pair of reflecting, (ie. (Mirror 1) and (Mirror 2)), means be as closely matched as possible to the combined reflecting means in the second pair of reflecting means, (ie. (Mirror 3) and (Mirror 4)). One approach to this is to obtain a multiplicity of reflecting means and, by ellipsometric testing, determine the DELTA of each to the end that four essentially identical reflecting means are identified. Another, modified approach, is to determine the DELTA's of each of four reflecting means, and match two thereof with the most closely matched DELTA's as the first pair, and match the other two, (which have the largest and smallest DELTA's), as the second pair. FIG. 6 shows the DELTA's of four reflecting means. Reflecting means 1 and 4 were combined as a fist pair of reflecting means, and reflecting means 2 and 3 were combined as a second pair of reflecting means.

Figure 7A:
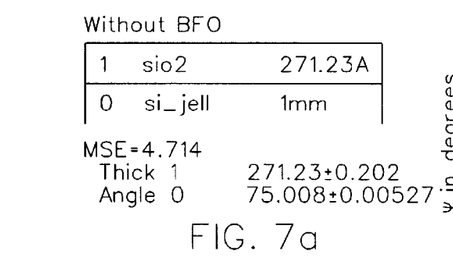
FIGS. 7a and 7b show results of ellipsometric investigation of a sample system utilizing a FIG. 1 ellipsometer system orientation.
Figure 7B:
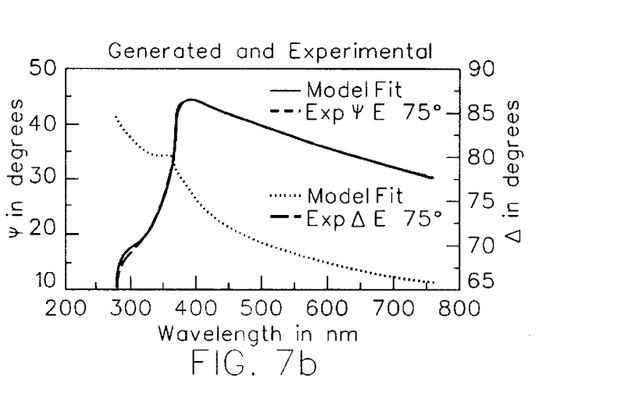
Figure 8A:
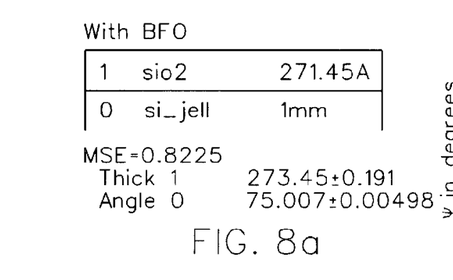
FIGS. 8a and 8b show results of similar ellipsometric investigation of the same sample system utilizing a FIG. 2a ellipsometer system orientation with a present invention beam folding optics (BFO) in place.
Figure 8B:
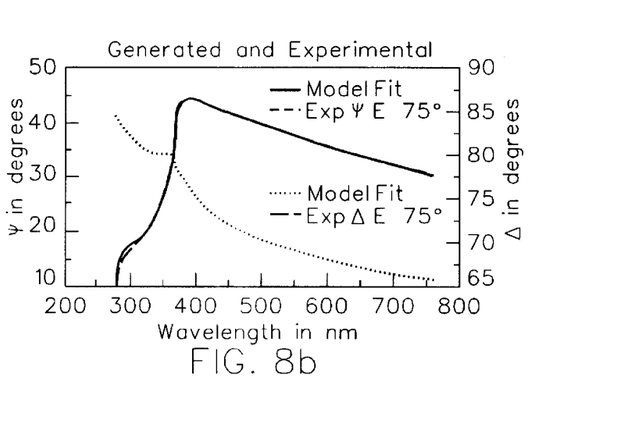

FIGS. 7a and 7b show results of ellipsometric investigation of a sample system utilizing a FIG. 1 ellipsometer system orientation; and FIGS. 8a and 8b show results of similar ellipsometric investigation of the same sample system utilizing a FIG. 2a ellipsometer system orientation with a present invention beam folding optics (BFO) in place. Said beam folding optics (BFO) utilized in obtaining the results shown in FIGS. 8a and 8b was constructed utilizing the reflecting means 1 and 4 in FIG. 6 as members of a first pair of reflecting means, and the reflecting means 2 and 3 in FIG. 6 as members of a second pair of reflecting means, said first and second pairs of reflecting means being combined into a system as shown in FIG. 5.

There remains to provide some mathematical basis and insight to support the results achieved by the present invention. Mathematically, changes in the polarization state of a beam of electromagnetic radiation can be described using Jones Matrices. A Vector with two complex elements describes the intensity and phase of p and s-polarized orthogonal components of an incident beam of electromagnetic radiation. A two by two complex matrix (or multiplied combinations thereof), can be used to describe the interaction (assuming that interaction does not depolarize the beam), of the input beam with an arbitrary optical system.

Multiplying the input Vector by the optical system Matrix yields a Vector which describes the state of polarization of the resulting output beam of electromagnetic radiation. Equation 1 shows an example of the just described formalism in which a perfect optical system, (represented by a "unity" Jones Matrix), transposes the beam of electromagnetic radiation from input to output.

$$\begin{bmatrix} Pout \\ Sout \end{bmatrix} = \begin{bmatrix} 1 & 0 \\ 0 & 1 \end{bmatrix} \cdot \begin{bmatrix} Pin \\ Sin \end{bmatrix} \quad (1)$$

Continuing, Equation 2 shows the Jones Matrix for a beam of electromagnetic radiation which reflects from a single mirror, in which the $\Psi$ and $\Delta$ are functions of the materials and coatings used to comprise the mirror, at a particular angle of incidence of the beam of electromagnetic radiation with respect to a sample system being investigated.

$$\begin{bmatrix} Pout \\ Sout \end{bmatrix} = k_{mirror} \cdot \begin{bmatrix} \tan(\Psi_{mirror}) \cdot e^{li \cdot \Delta_{mirror}} & 0 \\ 0 & 1 \end{bmatrix} \cdot \begin{bmatrix} Pin \\ Sin \end{bmatrix} \quad (2)$$

Figure 9A:
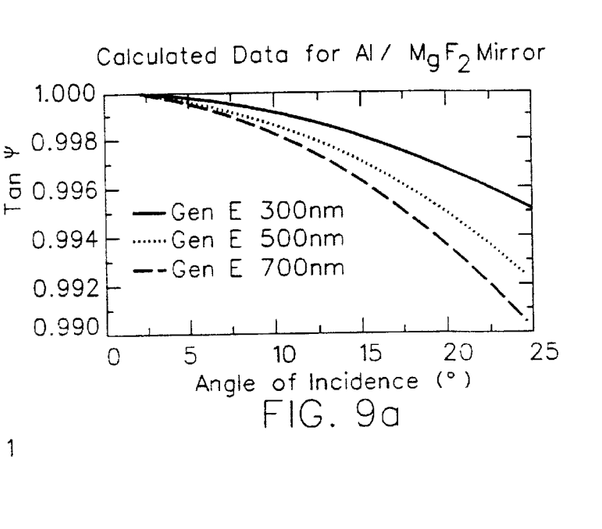
FIGS. 9a and 9b show Ψ and Δ values at three different wavelengths for a typical Aluminum mirror with three-hundred (300) Angstroms of $MgF_2$ deposited thereupon.
Figure 9B:
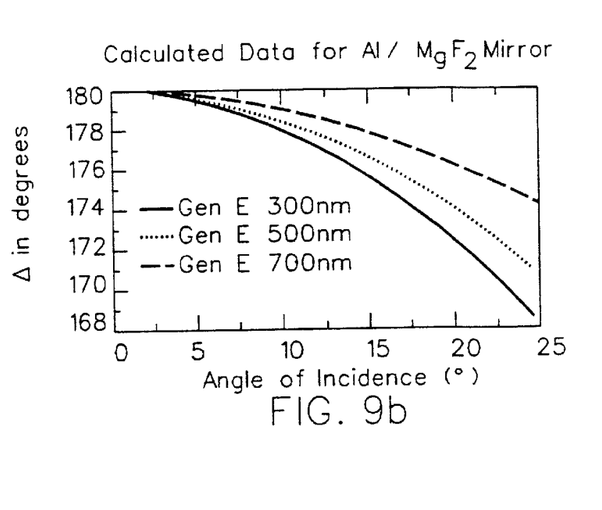

The '$k_{mirror}$' factor accounts for the average beam intensity loss due to interaction with a sample system, but as ellipsometry measures a ratio of p and s orthogonal components, the '$k_{mirror}$' factor can typically be ignored. $\Psi$ and $\Delta$ values can be calculated for a sample system utilizing standard Fresnel equations if the materials and optical coatings and thicknesses thereof are known. FIGS. 9a and 9b show Tan$\Psi$ and $\Delta$ values at three different wavelengths for a typical Aluminum mirror with three-hundred (300) Angstroms of $MgF_2$ deposited thereupon. Note an approximate linear change with Angle-of-Incidence for small changes therein.

Equation 3 mathematically describes the present invention Beam Folding Optics four mirror system of FIG. 5.

$$\begin{bmatrix} Pout \\ Sout \end{bmatrix} = \begin{bmatrix} \cos\left(\frac{\pi}{2}\right) & -\sin\left(\frac{\pi}{2}\right) \\ \sin\left(\frac{\pi}{2}\right) & \cos\left(\frac{\pi}{2}\right) \end{bmatrix} \cdot k_{m4} \cdot \begin{bmatrix} \tan(\Psi_{m4}) \cdot e^{li \cdot \Delta_{m4}} & 0 \\ 0 & 1 \end{bmatrix} \cdot \quad (3)$$

$$k_{m3} \cdot \begin{bmatrix} \tan(\Psi_{m3}) \cdot e^{li \cdot \Delta_{m3}} & 0 \\ 0 & 1 \end{bmatrix} \cdot \begin{bmatrix} \cos\left(\frac{\pi}{2}\right) & \sin\left(\frac{\pi}{2}\right) \\ -\sin\left(\frac{\pi}{2}\right) & \cos\left(\frac{\pi}{2}\right) \end{bmatrix} \cdot$$

$$k_{m2} \cdot \begin{bmatrix} \tan(\Psi_{m2}) \cdot e^{li \cdot \Delta_{m2}} & 0 \\ 0 & 1 \end{bmatrix} \cdot k_{m1} \cdot \begin{bmatrix} \tan(\Psi_{m1}) \cdot e^{li \cdot \Delta_{m1}} & 0 \\ 0 & 1 \end{bmatrix} \cdot \begin{bmatrix} Pin \\ Sin \end{bmatrix}$$

Note that two Rotation Matrices are also present to appropriately transform the coordinate system plane change between the first and second paris of mirrors.

Multiplying out the Matrices in Equation 3 provides Equation 4.

$$\begin{bmatrix} Pout \\ Sout \end{bmatrix} = k_{m1} \cdot k_{m2} \cdot k_{m3} \cdot \quad (4)$$

$$k_{m4} \cdot \begin{bmatrix} \tan(\Psi_{m1}) \cdot \tan(\Psi_{m2}) \cdot e^{li \cdot (\Delta_{m1}+\Delta_{m2})} & 0 \\ 0 & \tan(\Psi_{m3}) \cdot \tan(\Psi_{m4}) \cdot e^{li \cdot (\Delta_{m3}+\Delta_{m4})} \end{bmatrix} \cdot \begin{bmatrix} Pin \\ Sin \end{bmatrix}$$

And, if it is assumed that the pairs of mirrors are approximately matched, as quantified by Equation 5, then the resulting present invention Beam Folding Optics (BFO) can be described by Equation 6.

$$\tan(\Psi_{m1}) \cdot \tan(\Psi_{m2}) \cdot e^{li \cdot (\Delta_{m1}+\Delta_{m2})} = \tan(\Psi_{m3}) \cdot \tan(\Psi_{m4}) \cdot e^{li \cdot (\Delta_{m3}+\Delta_{m4})} \quad (5)$$

$$\begin{bmatrix} Pout \\ Sout \end{bmatrix} = K_{all\_mirrors} \cdot \begin{bmatrix} 1 & 0 \\ 0 & 1 \end{bmatrix} \cdot \begin{bmatrix} Pin \\ Sin \end{bmatrix} \quad (6)$$

As illustrated by FIG. 5, it is difficult to visualize the beam path as it reflects off the four mirrors, (Mirror 1), (Mirror 2), (Mirror 3) and (Mirror 4) in the present invention Beam Folding Optics (BFO). Each pair of mirrors deviates the beam by 4$\ominus$, where $\ominus$ is the angle of incidence of the incident chosen for each individual mirror reflection (since the angle of reflection is equal to the angle of incidence, each single mirror will change the beam by 2$\ominus$). Since the two pairs of mirrors do not have a common plane of incidence, the net change relative to the input beam is not simply 8$\ominus$, but is given by Equation 7:

Net change in beam angle=acos[cos(4$\Phi$)$^2$] (7)

which was derived by a geometric analysis. The net rotation in plane of incidence relative to the input beam is given by Equation 8.

Rotation in plane of incidence=atan[1/cos(4Φ)]   (8)

These formulas provide basis for present invention Beam Folding Optics design. For example, to fold a beam of electromagnetic radiation by seventy-five (75) degrees, (which is a typical angle of incidence used in ellipsometric measurements of semiconductor sample systems), angle (A1) is fou nd to be required to be (14.855) degrees, (see FIG. 5), and the rotation angle (A2) is then (104.982) degrees, (see FIG. 5).

It is to be further understood that where a FIG. 2b configuration is utilized, each of the first and second optic elements (PRI) &(PRO) respectively, can each comprise four reflecting means as shown in FIG. 5, or each can comprise only two reflecting means as shown in FIG. 3 or in FIG. 4, with a four reflecting means Beam Folding Optics System being comprised of a combined (PRI) & (PRO), (each of which have only two reflecting means).

Where both (PRI) and (PRO) each have four reflecting means, it is to be understood that it is possible that one thereof might not provide zero DELTA effect between orthogonal components of an electromagnetic beam caused to interact therewith, with the other of (PRI) and (PRO) serving to compensate therefore. That is, the first and second planes of incidence (Planes of incidence 1 and 2 in FIG. 5), can be oriented other than exactly perpendicular to one another in each of the (PRI) and (PRO) Beam Folding Optics, and the changes entered to the phase angle between orthogonal components therein, by the first of said Beam Folding Optics (eg. (PRI), be effectively compensated by said second Beam Folding Optics (eg. PRO).

Where both (PRI) and (PRO) each have only two reflecting means, it is important that the first and second planes of incidence (Planes of incidence 1 and 2 in FIG. 5), be oriented essentially exactly perpendicular to one another, (comparing the plane of incidence in the (PRI) to that in the (PRO) Beam Folding Optics), so that changes entered to the phase angle between orthogonal components in a beam of electromagnetic radiation by interaction with the first of said Beam Folding Optics (eg. (PRI), is effectively compensated by interaction with said second Beam Folding Optics (eg. PRO).

The Claims should be read to cover both such systems, with the word "essentially", (as applied to describe the plane of incidence in a first pair of reflecting means to that in a second pair of reflecting means), being meant to allow some deviation from a strictly orthogonal relationship between said first and second planes of incidence. That is, where a single Beam Folding Optics (BFO) system, with four reflecting means therein is utilized independently, the first and second planes of incidence must be very close to strictly orthogonal, or the present invention system of four reflecting means would provide results which can be easily achieved with a single reflective means. This is the case rather the first pair of reflecting means is closely situated with respect to a second pair of reflecting means, (as indicated in FIG. 5), or is situated at some distance therefrom, (as indicated in FIG. 2b). Where, however, two "four reflecting means" containing Beam Folding Optics (BFO) systems are used simultaneously, (as indicated by FIG. 2b where each of (PRI) and (PRO) are considered to each contain four reflecting means), then the relationship between first and second planes of incidence in each "four reflecting means" containing Beam Folding Optics (BFO) system can be other than strictly orthogonally oriented with respect to one another, with phase shift entered by a first "four reflecting means" containing Beam Folding Optics (BFO) system being canceled by a second "four reflecting means" containing Beam Folding Optics (BFO) system. Also, FIG. 2b shows an example, and it is to be understood that the (PRI) and (PRO) beam folding optics can provide electromagnetic beams (LBI) and (LBO) in essentially and directions.

Finally, while effect of the present invention on phase angle between orthogonal components of a beam of electromagnetic radiation caused to pass therethrough has been stressed in this Disclsoure, it is to be also inherently appreciated, that the present invention effect on the magnitude ratio of said orthogonal components of a beam of electromagnetic radiation is typically negligible.

Having hereby disclosed the subject matter of the present invention, it should be obvious that many modifications, substitutions, and variations of the present invention are possible in view of the teachings. It is therefore to be understood that the invention may be practiced other than as specifically described, and should be limited In its breadth and scope only by the claims.

We claim:

1. A system for changing the initial propagation direction of a beam of electromagnetic radiation without significantly changing the phase angle between orthogonal components thereof, comprising two pairs of reflecting means oriented so that said initial beam of electromagnetic radiation reflects from a first reflecting means in the first pair of reflecting means to a second reflecting means in said first pair of reflecting means, in a first plane, and such that the beam of electromagnetic radiation which reflects from said second reflecting means in said first pair of reflecting means is directed to a first reflecting means in the second pair of said reflecting means, and reflects from said first reflecting means in said second pair of reflecting means to a second reflecting means in said second pair of reflecting means, in a second plane which is essentially orthogonal to said first plane; such that the direction of propagation of the beam of electromagnetic radiation reflected from the second of the reflecting means in the second pair of reflecting means is different from the propagation direction of the initial beam of electromagnetic radiation;

the basis of operation being that changes entered to the phase angle between orthogonal components of a beam of electromagnetic radiation by the first of said pairs of reflecting means are effectively canceled by said second pair of reflecting means.

2. A system for changing the initial propagation direction of a beam of electromagnetic radiation without significantly changing the phase angle between orthogonal components thereof as in claim 1, in which each of the first and second reflecting means of each of said first and second pairs thereof, have essentially identical optical properties.

3. A system for changing the initial propagation direction of a beam of electromagnetic radiation without significantly changing the phase angle between orthogonal components thereof as in claim 1, in which one of the reflecting means in the first pair of reflecting means has optical properties which are essentially identical to the optical one of the reflecting means in the second pair of reflecting means.

4. A system for changing the initial propagation direction of abeam of electromagnetic radiation without significantly changing the phase angle between orthogonal components thereof as in claim 1, in which said first and second planes are oriented strictly perpendicular to one another and one of the following conditions applies:

a. the electromagnetic beam of radiation which reflects from the second reflective means of the first pair of reflective means proceeds directly to the first reflective means of the second pair of reflective means; and b. the electromagnetic beam of radiation which reflects from the second reflective means of the first pair of reflective means interacts with a sample system prior to proceeding to the first reflective means of the second pair of reflective means.

5. A method of providing a beam of electromagnetic radiation with a direction of propagation changed from the direction of propagation of an initial beam of electromagnetic radiation, without significantly changing the phase angle between orthogonal components in said beam of electromagnetic radiation, comprising the steps of:

a. providing a system for changing the initial propagation direction of a beam of electromagnetic radiation without significantly changing the phase angle between orthogonal components thereof, comprising two pairs of reflecting means oriented so that said initial beam of electromagnetic radiation reflects from a first reflecting means in the first pair of reflecting means to a second reflecting means in said first pair of reflecting means, in a first plane, and such that the beam of electromagnetic radiation which reflects from said second reflecting means in said first pair of reflecting means is directed to a first reflecting means in the second pair of said reflecting means, and reflects from said first reflecting means in said second pair of reflecting means to a second reflecting means in said second pair of reflecting means, in a second plane which is essentially orthogonal to said first plane; such that the direction of propagation of the beam of electromagnetic radiation reflected from the second of the reflecting means in the second pair of reflecting means is different from the propagation direction of the initial beam of electromagnetic radiation;

the basis of operation being that changes entered to the phase angle between orthogonal components of a beam of electromagnetic radiation by the first of said pairs of reflecting means are effectively canceled by said second pair of reflecting means;

b. causing an initial beam of electromagnetic radiation to impinge upon the first reflecting means in the first pair of reflecting means and reflect therefrom;

c. accessing a resulting beam of electromagnetic radiation with a changed direction of propagation which reflects from the second reflecting means in the second pair of reflecting means.

6. A method of providing a beam of electromagnetic radiation with a direction of propagation changed from the direction of propagation of an initial beam of electromagnetic radiation as in claim 5, in which the step of causing an initial beam of electromagnetic radiation to impinge upon the first reflecting means in the first pair of reflecting means and reflect therefrom, involves providing an essentially horizontally oriented propagation direction, initial beam of electromagnetic radiation.

7. A method of providing a beam of electromagnetic radiation with a direction of propagation changed from the direction of propagation of an initial beam of electromagnetic radiation as in claim 5, in which the step of causing an initial beam of electromagnetic radiation to impinge upon the first reflecting means in the first pair of reflecting means and reflect therefrom, involves providing an essentially vertically oriented propagation direction, initial beam of electromagnetic radiation.

8. A material system investigating system selected from the group consisting of:
 ellipsometer;
 polarimeter; and
 reflectometer systems;

said material system investigating system comprising:
a. a light source (LS);
b. a polarizer (P);
c. a first optic element (PRI);
d. a first focusing optic (F1);
e. a material system stage (STG);
f. a second focusing optic (F2);
g. a second optic element (PRO);
h. an analyzer (A);
i. a detector (DET); and
j. optionally compensator(s) (C) (C');

said light source (LS) and a polarizer (P), serving in use to produce a generally horizontally oriented propagation direction, polarized beam of electromagnetic radiation (LBI), said generally horizontally oriented propagation direction, polarized beam of electromagnetic radiation (LBI) being caused to interact with a first optic element (PRI) and become other than a generally horizontally oriented propagation direction, polarized beam of electromagnetic radiation (LBI') which is caused to pass through said first focusing optic (F1) and reflectively interact with a material system (MS) placed upon said material system stage (STG), said reflective interaction with said material system (MS) causing an other than generally horizontally oriented propagation direction, polarized beam of electromagnetic radiation (LBO') to pass through said second focusing optic (F2) and interact with said second optic element (PRO), in which second optic element (PRO) said generally other than horizontally oriented propagation, direction, polarized beam of electromagnetic radiation (LBO') is caused to become a generally horizontally oriented propagation direction, polarized beam of electromagnetic radiation (LBO), which generally horizontally oriented propagation direction, polarized beam of electromagnetic radiation then (LBO) then passes through analyzer (A) and, via an aperture (AP), enters said detector system (DET) for analysis, which generally other than horizontally oriented propagation direction, polarized beams of electromagnetic radiation (LBI') and (LBO') approach and are reflected from, respectively, said material system (MS) at essentially equal angles of Incidence and reflection ($\Theta$), as viewed in frontal elevation;

wherein said first (PRI) and second optic (PRO) elements are each beam folding optics (BFO) systems for changing the initial propagation direction of a beam of electromagnetic radiation without significantly changing the phase angle between orthogonal components thereof, each of said first (PRI) and second optic (PRO) elements comprising two pairs of reflecting means oriented so that said initial beam of electromagnetic radiation reflects from a first reflecting means in the first pair of reflecting means to a second reflecting means in said first pair of reflecting means, in a first plane, and such that the beam of electromagnetic radiation which reflects from said second reflecting means in said first pair of reflecting means is directed to a first reflecting means in the second pair of said reflecting means, and reflects from said first reflecting means in said second pair of reflecting means to a second reflecting means in said second pair of reflecting means, in a second plane which is essentially orthogonal to said first plane; such that the direction of propagation of the beam of electromagnetic radiation reflected from the second of the reflecting means in the second pair of reflecting means is different from the propagation direction of the initial beam of electromagnetic radiation;

the basis of operation being that changes entered to the phase angle between orthogonal components thereof, by the first of said pairs of reflecting means are effectively canceled by said second pair of reflecting means.

9. A material system investigating system as in claim 8 in which the generally other than horizontally oriented propagation direction, is a generally vertically oriented propagation direction.

10. A material system investigating system as in claim 6 in which said first focusing optics (F1) serves to produce a focused, very concentrated high intensity small area generally other than horizontally oriented propagation direction, polarized beam of electromagnetic radiation (LBI') at the location of the material system, and said second focusing optic (F2) serves to collimate the polarized beam of electromagnetic radiation (LBO') which results from the focused very concentrated high intensity small area generally other than horizontally oriented propagation direction, polarized beam of electromagnetic radiation (LBI') being reflected from said material system (MS).

11. A material system investigating system as in claim 8 in which smaller angles of incidence and reflection of said generally other than horizontally oriented propagation direction, polarized beams of electromagnetic radiation (LBI') and (LBO') with respect to said material system (MS) result in higher intensity and smaller "spot" size of said polarized beam of electromagnetic radiation caused on said material system (MS).

12. A material system investigating system as in claim 11 in which said higher beam intensity and reduced Sample system Investigating spot size are realized without difficult light source (LS) and detector (DET) alignment being required, but rather by relatively easy adjustment of first and second optical element (PRI) and (PRO) orientations.

13. A material system investigating system as in claim 8 which in use is rotated about at least one axis, so as to place the generally horizontally oriented propagation direction, of said generally horizontally oriented propagation direction, polarized beams of electromagnetic radiation (LBI) and (LBO) and/or the other than generally horizontally oriented propagation direction of said other than generally horizontally oriented propagation direction, polarized beams of electromagnetic radiation (LBI') and (LBO') out of alignment with external frame of reference generally horizontally oriented and/or generally other than horizontally oriented direction(s).

14. A method of investigating a material system comprising the steps of:
  a. providing a material system investigating system comprising:
    a. a light source (LS);
    b. a polarizer (P);
    c. a first optic element (PRI);
    d. a first focusing optic (F1);
    e. a material system stage (STG);
    f. a second focusing optic (F2);
    g. a second optic element (PRO);
    h. an analyzer (A);
    i. a detector (DET); and
    j. optionally compensator(s) (C) (C'));
  said light source (LS) and polarizer (P), serving in use to produce a generally horizontally oriented propagation direction, polarized beam of electromagnetic radiation (LBI), said generally horizontally oriented propaqation direction, polarized beam of electromagnetic radiation (LBI) being caused to interact with said first optic element (PRI) and become a generally vertically oriented propagation direction, polarized beam of electromagnetic radiation (LBI') which is caused to pass through said first focusing optic (F1) and reflectively interact with a material system (MS) placed upon said material system stage (STG), said reflective interaction with said material system (MS) causing a generally vertically oriented propagation direction, polarized beam of electromagnetic radiation (LBO') to pass through said second focusing optic (F2) and interact with said second optic element (PRO), in which second optic element (PRO) said generally vertically oriented propagation direction, polarized beam of electromagnetic radiation (LBO') is caused to become a generally horizontally oriented propagation direction, polarized beam of electromagnetic radiation (LBO), which generally horizontally oriented propagation direction, polarized beam of electromagnetic radiation then (LBO) then passes through analyzer (A) and, via an aperture (AP) enters said detector system (DET) for analysis, which generally vertically oriented propagation direction, polarized beams of electromagnetic radiation (LBI') and (LBO') approach and are reflected from, respectively, said material system (MS) at essentially equal angles of Incidence and reflection ($\ominus$), as viewed in frontal elevation;
  wherein said first (PRI) and second (PRO) optic elements are each systems for changing the initial propagation direction of a beam of electromagnetic radiation without significantly changing the phase angle between orthogonal components thereof, comprising two pairs of reflecting means oriented so that said initial beam of electromagnetic radiation reflects from a first reflecting means in the first pair of reflecting means to a second reflecting means in said first pair of reflecting means, in a first plane, and such that the beam of electromagnetic radiation which reflects from said second reflecting means in said first pair of reflecting means is directed to a first reflecting means in the second pair of said reflecting means, and reflects from said first reflecting means in said second pair of reflecting means to a second reflecting means in said second pair of reflecting means, in a second plane which is essentially orthogonal to said first plane; such that the direction of propagation of the beam of electromagnetic radiation reflected from the second of the reflecting means in the second pair of reflecting means is different from the propagation direction of the initial beam of electromagnetic radiation;
  b. causing said light source (LS) and polarizer (P), to produce a generally horizontally oriented propagation direction, polarized beam of electromagnetic radiation (LBI);
  c. causing said generally horizontally oriented propagation direction, polarized beam of electromagnetic radiation (LBI) to interact with said first optic element (PRI) and become a generally vertically oriented propagation direction, polarized beam of electromagnetic radiation (LBI') which is caused to pass through said first focusing optic (F1) and interact with a material system (MS) placed upon said material system stage (MS);

d. causing a generally vertically oriented propagation direction, polarized beam of electromagnetic radiation (LBO') provided by said generally vertically oriented propagation direction, polarized beam of electromagnetic radiation (LBI') interaction with said material system (MS) to pass through said second focusing optic (F2) and interact with said second optic element (PRO), in which second optic element (PRO) said generally vertically oriented propagation direction, polarized beam of electromagnetic radiation (LBO') is caused to become a generally horizontally oriented propagation direction, polarized beam of electromagnetic radiation (LBO);

e. causing said generally horizontally oriented propagation direction, polarized beam of electromagnetic radiation (LBO) to pass through said analyzer (A) and said aperture (AP) and enter detector system (DET);

wherein analysis of said generally horizontally oriented propagation direction, polarized beam of electromagnetic radiation (LBO) is performed.

15. A method of investigating a material system as in claim 14 which further comprises the step of rotating the material system investigating system about at least one axis so as to place the generally horizontally oriented propagation direction, of said generally horizontally oriented propagation direction, polarized beams of electromagnetic radiation (LBI) and (LBO) and/or the generally vertically oriented propagation direction, of said generally vertically oriented propagation direction, polarized beams of electromagnetic radiation (LBI') and (LBO') out of alignment with external frame of reference generally horizontally oriented and/or generally vertically oriented direction(s).

16. A system for changing the initial propagation direction of a beam of electromagnetic radiation without significantly changing the phase angle between orthogonal components thereof, comprising:

a. a first system comprising two pairs of reflecting means oriented so that said initial beam of electromagnetic radiation reflects from a first reflecting means in the first pair of reflecting means to a second reflecting means in said first pair of reflecting means, in a first plane, and such that the beam of electromagnetic radiation which reflects from said second reflecting means in said first pair of reflecting means is directed to a first reflecting means in the second pair of said reflecting means, and reflects from said first reflecting means in said second pair of reflecting means to a second reflecting means in said second pair of reflecting means, in a second plane which is other than parallel to said first plane; such that the direction of propagation of the beam of electromagnetic radiation reflected from the second of the reflecting means in the second pair of reflecting means is different from the propagation direction of the initial beam of electromagnetic radiation;

b. a sample system; and c. a second system comprising two pairs of reflecting means oriented so that said initial beam of electromagnetic radiation reflects from a first reflecting means in the first pair of reflecting means to a second reflecting means in said first pair of reflecting means, in a first plane, and such that the beam of electromagnetic radiation which reflects from said second reflecting means in said first pair of reflecting means is directed to a first reflecting means in the second pair of said reflecting means, and reflects from said first reflecting means in said second pair of reflecting means to a second reflecting means in said second pair of reflecting means, in a second plane which is other than parallel to said first plane; such that the direction of propagation of the beam of electromagnetic radiation reflected from the second of the reflecting means in the second pair of reflecting means is different from the propagation direction of the initial beam of electromagnetic radiation;

such that in use the electromagnetic beam of radiation which reflects from the second reflective means of the first pair of reflective means interacts with a sample system prior to proceeding to the first reflective means of the second pair of reflective means;

the basis of operation being that total changes entered to the phase angle between orthogonal components of a beam of electromagnetic radiation by said first and second systems comprising two pairs of reflecting means of reflecting means, sum to essentially zero.

* * * * *